June 16, 1964   R. ARNAUD   3,137,425
APPARATUS FOR SEVERING OR BREAKING SHEETS OF GLASS
Filed Oct. 20, 1959   3 Sheets-Sheet 2
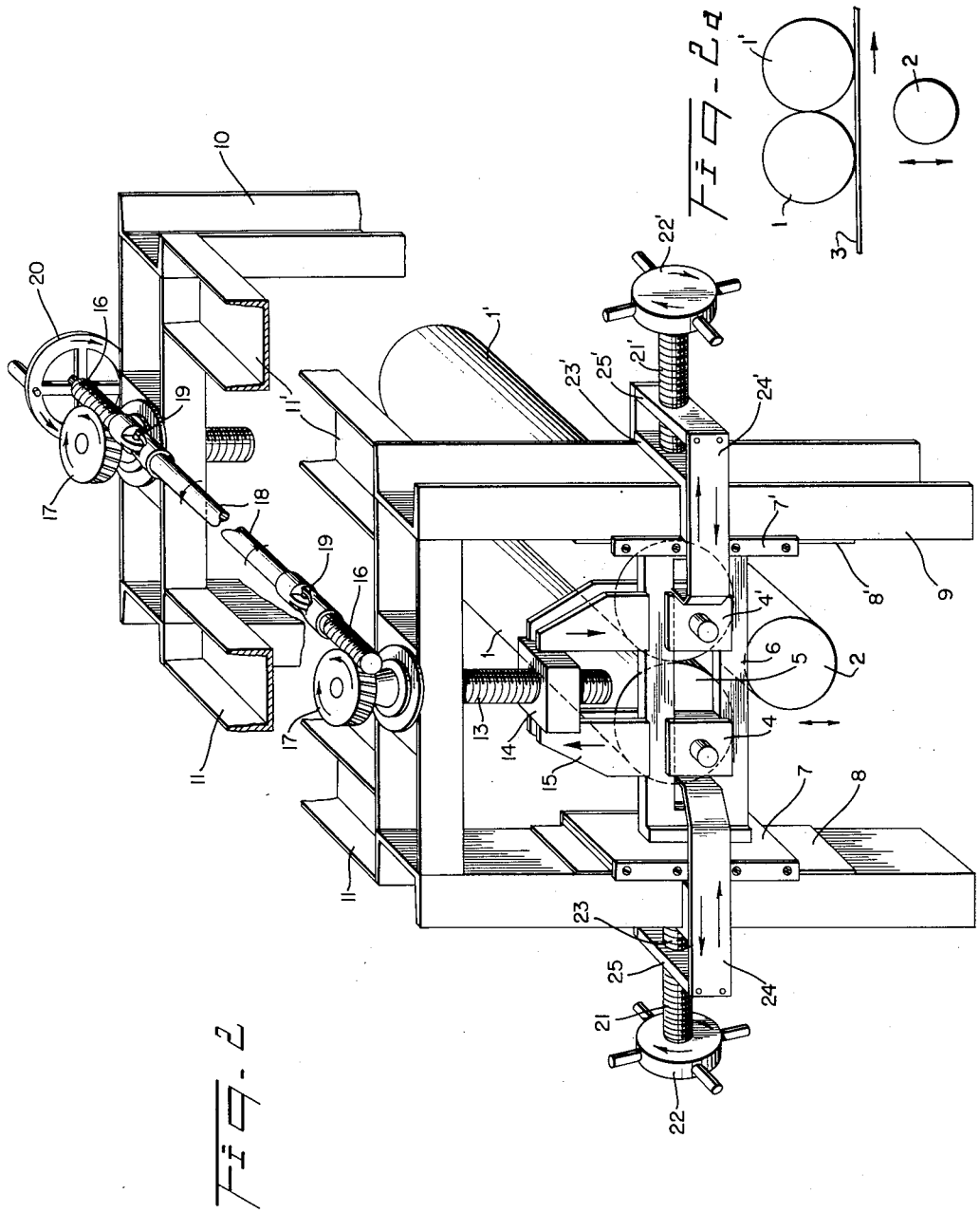
INVENTOR.
ROBERT ARNAUD
BY Bauer and Seymour
ATTORNEYS

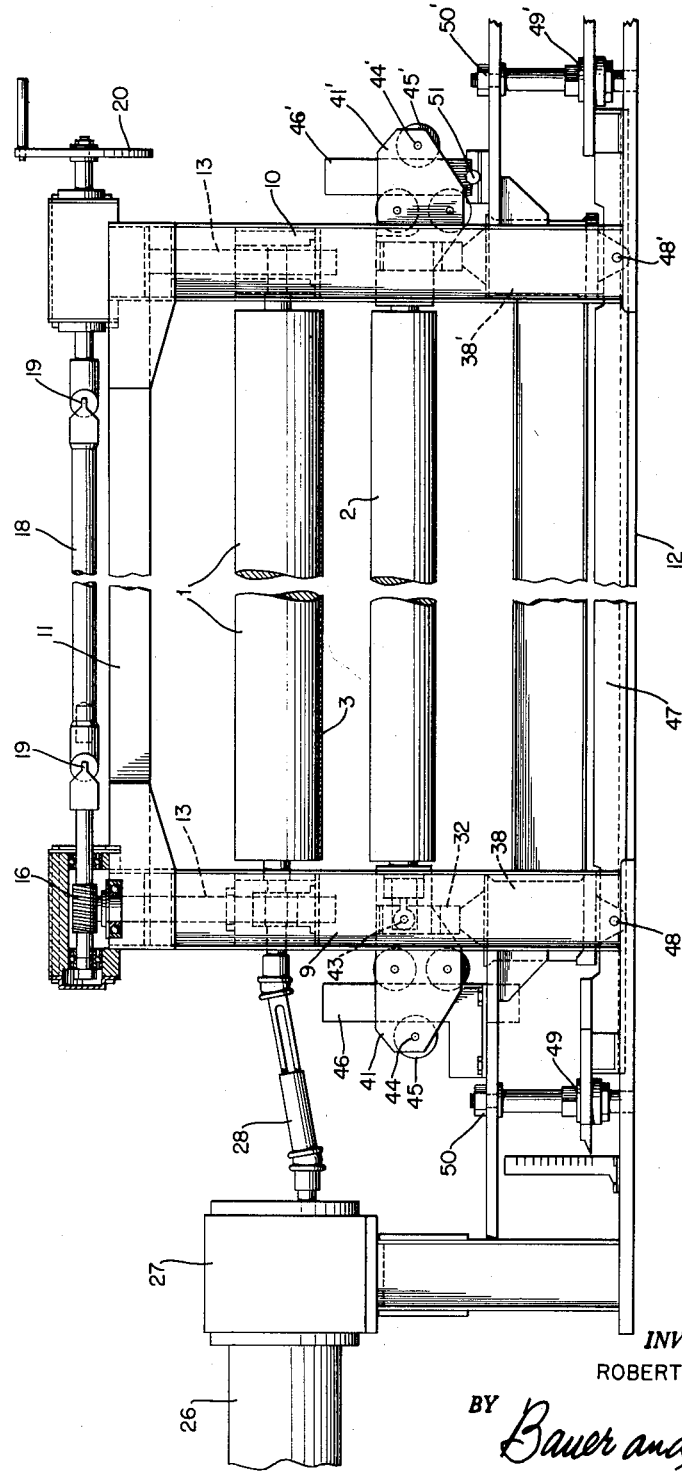

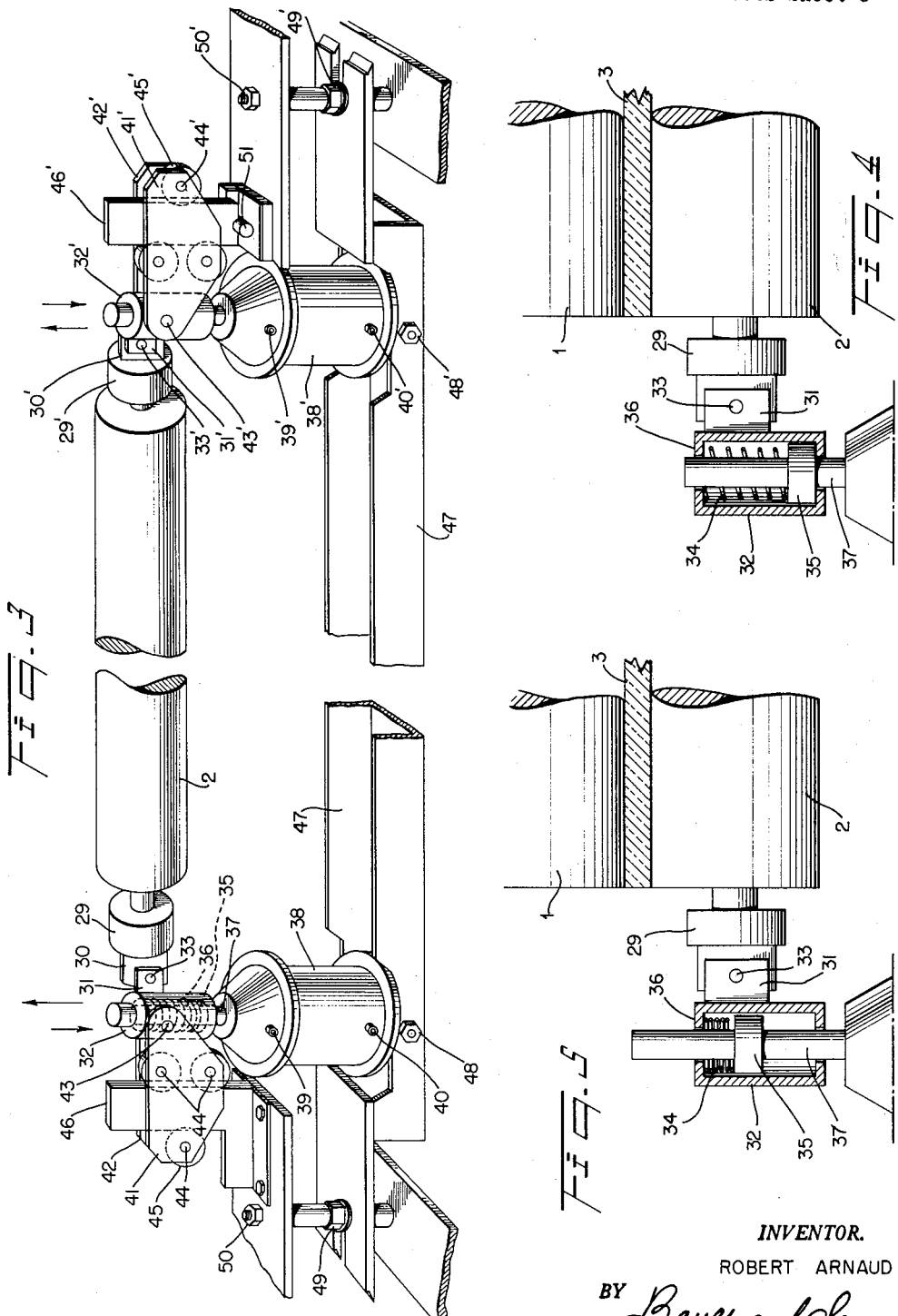

United States Patent Office 3,137,425
Patented June 16, 1964

3,137,425
APPARATUS FOR SEVERING OR BREAKING SHEETS OF GLASS
Robert Arnaud, La Celle-Saint-Cloud, France, assignor to Compagnie de Saint-Gobain, Paris, France
Filed Oct. 20, 1959, Ser. No. 847,493
Claims priority, application France Oct. 23, 1958
11 Claims. (Cl. 225—93)

The present invention relates to apparatus for breaking or severing glass, and is particularly adapted for the severing of glass along a transverse score line which has been made therein.

Apparatus according to the invention is principally characterized by having two upper parallel horizontal rollers, and a lower roller having its axis parallel to those of the upper rollers and lying in the vertical plane parallel to and midway between the axes of the upper rollers. The lower roller is mounted for vertical travel so as selectively to subject a sheet or plate of glass lying with its upper surface in contact with the lower surfaces of the upper rollers to forcible, glass-breaking contact. In preferred embodiments of the invention the two upper rollers may be vertically adjusted as required, and also may be adjusted toward and away from each other in the horizontal plane of their axes.

Another principal feature of the invention is the fact that the movement of the lower roll, and its forcible application to the glass, are effected by two pneumatic jacks acting upon the ends of the lower roller through the intermediary of springs.

It is possible to break or sever glass without imposing positive pressure on the lower roll provided the lower roll is backed up with an elastic abutment, for example rubber, and the thickness or gauge of the passage between the upper and lower rolls is slightly less than the thickness of the sheet or plate of glass. Under such conditions a sheet or plate of glass forced between the rolls will be broken along the score line therein. But in such apparatus, wherein a positive pressure is not exerted upon the glass, the pressure will inevitably be non-uniform along the line on which the glass is to be severed, primarily because the rollers are not exactly parallel. Such unequal pressures may cause a defective breaking of the glass and, for example, the cracking of the parts thereof on one or both of the line along which it is desired to break the glass.

In the apparatus according to the invention, on the other hand, there may be imposed a positive pressure on the lower roll, and there is assurance that the sheet or plate of glass will be subjected to uniform pressure along the entire length of the line of breakage, and that there will be obtained a regular and perfect cutting of the glass. The lower roller may, if desired, be made to press upon the glass with variable force by modifying the pressure at which fluid is fed into the jacks which vertically adjust the lower roll. The springs interposed between the jacks and their points of application to the lower roll allow pressure to be applied by the latter with a desirable resilience, taking into account the force necessary for the raising of the pistons when the jacks are not in operation.

The apparatus in accordance with the invention may also function to break glass by mechanical shock, that is, by elevating the lower roll at such speed that it strikes the bottom of the glass with appreciable force. In such case the plate or sheet of glass is fed into the machine with the upper surface thereof in contact with the two upper rolls and with the lower roll in a lowered position. When the glass has traveled longitudinally to the desired position, that is when the score line is in alignment with the lower cylinder, air under pressure is directed to the cylinders so as to cause the lower roll to rise rapidly so as to break the glass along the desired line. This operation is somewhat analogous to that by which workers cut glass by hand.

The rising and lowering of the lower roll is under the control of a mechanism, forming a part of the invention, which compensates for the impossibility of actuating two jacks at exactly the same time. In its movement the lower roll drives at each of its extremities a carriage which runs along a vertical guide. One of such guides is fixed, but the other guide is mounted for pivoting about a horizontal axis. This allows the guide to yield slightly so that the lower roll may momentarily assume a position out of parallelism with that of the upper rolls. Such guiding mechanism, however, restores the lower roll to a condition of parallelism by the time it approaches its upper, operative position.

There is shown in the drawings a preferred but non-limiting embodiment of glass-breaking apparatus in accordance with the invention. In the drawings:

FIG. 1 is a view in end elevation of such illustrative embodiment of the apparatus;

FIG. 2 is a fragmentary view in perspective illustrating the upper rolls and the mounting and adjusting means therefor, said view showing the lower roll diagrammatically in its association with the the upper rolls;

FIG. 2a is a schematic view in end elevation showing the relationship between the upper rolls and the lower roll;

FIG. 3 is a fragmentary view in perspective of the lower roll, the mounting and adjusting jacks therefor, and the guiding mechanism at the ends of the roll;

FIG. 4 is a fragmentary view of the apparatus showing the lower roll raised into operative position but exerting a relatively low pressure upon the glass; and FIG. 5 is a view similar to FIG. 4 but showing the lower roll being pressed with greater force against the glass.

The upper rolls 1 and 1' and the lower roll 2 are made up of tubes which may, for example, be in the form of metallic tubular cores having a sheath or covering of rubber or the like thereon. The glass sheet or plate 3 is caused to travel between the upper rolls and the lower roll, in contact with the former, by conveyor means (not shown) located in advance of and beyond the exit end of the glass-breaking apparatus of the invention.

The upper rolls 1 and 1' are journaled at their ends in bearing blocks 4, 4' which are mounted in the window 5 of the vertically adjustable end plate member 6. Plate member 6 is provided at its ends with guide plates 7—7' which are attached thereto, plates 7—7' being slidable with respect to fixed plates 8, 8' affixed to the respective vertical member of the end frames 9 and 10. Each end frame is formed of metal members of U section, such members being secured together as by welding, riveting, or the like. The end frame members are secured together by suitable cross members such as the upper cross members 11, 11' and by the base member 12 to which members 9 and 10 are secured.

Rolls 1 and 1' may be adjusted vertically as a unit, and may be adjusted horizontally relative to and independently of each other. To allow such vertical adjustment the end plates 6 are suspended from screws 13 which threadedly engage nut members 14 affixed to plate members 15 which are secured to members 6. Screws 13 are rotated by worms 16 which mesh with worm wheels 17 secured to the upper ends of the respective screws 13. Worms 16 are connected by shaft 18 having two universal joints 19 therein, as shown, shaft 18 being rotated as required by a hand wheel 20 affixed thereto.

Rolls 1, 1' are adjusted horizontally by the following means. Each of the bearing blocks 4, 4' has a generally U-shaped 24—24 member affixed to the outer edge thereof and embracing the respective vertical side member of the end frames 9, 10. Thus one leg of such U-shaped member 24—24' lies in front of vertical member 9—10 and a similar member lies in back of member 9—10. The outer ends of such members are connected by plates 25—25' having a central threaded horizontal passage therein in which there is threadedly mounted a screw 21—21'.

The horizontal adjustment in both directions of rolls 1—1' are obtained by the screws 21—21' provided with handle 22—22' and engaging the plates 23—23'. The U-shaped members 24—24' secured on the one hand to the bearings 4—4' and on the other hand to threaded plates 25—25', transmit to the bearings 4—4', the displacement of plates 25—25' on plates 21—21'. The lateral position of each end of each of rollers 1, 1' may thus readily be adjusted by suitably turning the respective screw 21 or 21', as the case may be.

The rolls 1 and 1' are rotatably driven by a series direct current motor 26 through a suitable speed reducer 27 and thus through drive shafts 28 to the ends of the respective rolls. Shaft 28 is in two parts and provided with two universal joints as shown and has two portions slidably connected together by splines and grooves, to allow axial displacements one to another and to change in length as required by the vertical adjustment of the upper rolls. The lower roll 2 is mounted freely rotatably in bearing blocks 29, 29', the rear end of which is provided with vertically disposed central ears 30, 30' engaged in clevis 31—31' of hollow cylindrical members 32, 32', respectively. A pivot pin 33, 33' ensures the connexion of the ears and their respective clevis, so as to allow the lower roll 2 appreciable freedom of pivotal motion in a vertical plane at each of its ends.

The cylindrical members 32, 32' are similar, and so only member 32 need be described in detail. Member 32 includes a hollow cylindrical body, centrally apertured bottom and cover portions, the latter being designated 34, a piston 35 and a coil spring 36. A piston rod 37 of a jack 38 extends through and is guided in the apertures in the top and bottom of member 32. The coil compression spring 36 mounted between piston 35 and cover 34 constantly urges such cover and piston 34 away from each other into the position shown in FIG. 4.

The two jacks 38—38' cause the lower roll 2 to move vertically, the roll being raised when air under pressure is introduced into the lower ports 40, 40', air then being exhausted through ports 39, 39', and to be lowered when air is exhausted through ports 40, 40' and introduced into ports 39, 39'.

Each cylindrical guiding element 32, 32' is mounted between parallel plates 41, 42, and 41', 42'. Each cylindrical guiding element is pivotally mounted to the respective plates by pivot pins 43 and 43', respectively. Each of the plates, 41 and 42, is maintained separated by three pins, the pins associated with plates 41 and 42 being designated 44, and those associated with plates 41' and 42' being designated 44'. Pins 44—44' serve as axles for three double flanged rollers 45—45' mounted for free rotation thereon. Two of such rollers, adjacent the inner ends of the plates, are mounted vertically one above the other, and the third of such rollers is disposed parallel to the others and one above the other, and the third of such rollers is disposed parallel to the others and adjacent the outer edge of the plates. The thus mounted rollers 45—45' engage the inner and outer vertical edges, respectively, of vertically disposed guide members 46—46'. The left hand guide member 46 (FIG. 3) is rigidly affixed to the frame of the apparatus and is maintained in vertical position. The guide member 46', disposed at the right in FIG. 3, is disposed generally vertically upon its side frame member of the apparatus, but is free to pivot somewhat in the vertical plane of the axis of roll 2 about a pivot pin 51 which attaches its lower inner edge to the frame of the apparatus.

The jacks 38, 38' are pivotally supported upon a cross frame member 47 by means of pivot pins 48, 48' which attach the lower ends of the cylinders to member 47. Cross member 47 may be adjusted in height by nut and screw devices 49, 50 and 49', 50' disposed at the respective ends of the apparatus. Thus the outer ends of member 47 are provided with centrally outwardly slotted horizontal extensions secured thereto. The vertical screws are secured at their upper ends to fixed frame structure of the apparatus; the extension plates on member 47 receive the screws through the slots therein. The vertical position of the extension plates is adjusted and maintained by nuts overlying such slots above and below the plate.

The above-described apparatus operates as follows: the two upper rolls, 1, 1', rotate in the same direction and at the same speed during the advance of the sheet of glass thereunder. The jacks 38, 38', subjected to air under pressure directed thereto through ports 40, 40', maintain the lower roller 2 in an elevated position predetermined to permit to introduce the glass sheet 3 between the upper rolls 1, 1' and the lower roll 2. The two jacks 38, 38' are supplied with fluid under pressure from the same source. Because it is practically impossible to assure that the pistons in both cylinders will move simultaneously and in the same manner when subjected to pressure, the tendency of guide means 46—46' to jam is obviated by the pivotal mounting of lower roll on the pivot pins 33—33' and 43—43', and on the pivot pin 51.

Because of the springs such as spring 36 the lower roll is applied to glass 3 with equal force in all points at the moment when the score line on the upper face of the glass is presented in alignment with the lower roll. The force exerted by this roll tends to open the score line. Thus there is no tendency to break the glass other than along a true transverse line.

As above indicated, the apparatus of the invention may be employed to break glass by the shock method. In an alternative method, the lower roll is maintained in a lowered or retracted position while the glass travels through the apparatus. In such method the glass need touch none of the rollers. When the score line in the glass reaches the vertical plane containing the axis of the lower roll 2, cylinders 38, 38' are subjected to air pressure through ports 40, 40'. Roll 2 then rises rapidly and in impinging upon the glass sheet causes it to break through shock while raising it somewhat above its initial position in order to facilitate such breakage.

Whereas we have shown only one of the embodiments of the invention in the accompanying drawings and described only one in the foregoing specification, it is to be expressly understood that various changes, such as in the relative dimensions in the parts, materials used, and the like as well as the suggested manner of use of the apparatus of the invention, may be made therein without departing from the spirit and scope of the invention as will now be apparent to those skilled in the art.

What is claimed is:

1. Apparatus for severing a glass sheet scored along a predetermined line, comprising a set of two parallel rolls, a third roll parallel and in staggered relation thereto, means to move the scored glass sheet between the third roll and the set, means to move the third roll toward the set to press the glass sheet thereagainst including guide means, and bearing support means for the third roll which is mounted on the guide means and includes means to maintain the third roll parallel to the rolls of the set as it moves toward and away from the set.

2. Apparatus for severing a glass sheet at a predetermined line therealong, comprising a set of two parallel rolls and a third roll parallel thereto, the third roll being movable relatively toward and away from the set of two parallel rolls and positioned in the plane normal to the plane through the axes of the two rolls of the set and at equal distances therebetween, and means for moving the third roll toward the set of rolls and for applying a pressure to said third roll which will be transmitted to a glass sheet located between the set of rolls and the third roll while maintaining its parallelism therewith, so as to sever a sheet of glass at a line therealong located generally in alignment with the third roll, said last named means comprising bearings on the respective ends of the lower roll, two expansible reciprocable fluid motors for moving the third roll, the motors being disposed parallel to the direction of movement of the third roll and connected to the respective bearings on the ends of the third roll.

3. Apparatus as defined in claim 1, wherein the set of rolls are upper rolls and are located above the third roll, the plane through the axes of the rolls of the set is horizontal, and the third roll is a lower roll and reciprocates vertically in a vertical plane located midway between the rolls of the roll set.

4. Apparatus as defined in claim 3, comprising two expansible reciprocable fluid motors for moving the lower roll, the motors being disposed vertically and connected to the bearing support means on the respective ends of the lower roll.

5. Apparatus as defined in claim 4, comprising bearings on the respective ends of the lower roll, fittings interposed between and pivotally connecting the said bearings and the respective fluid motor, and a spring associated with each of the fittings and interposed between the respective bearing and its fluid motor.

6. Apparatus for severing a glass sheet at a predetermined line therealong, comprising a set of two upper parallel rolls and a third, lower roll parallel thereto, the plane through the axes of the two upper rolls being horizontal, the lower roll being mounted for reciprocation vertically toward and away from the two upper rolls in a vertical plane located midway between the two upper rolls, the axes of the upper rolls being fixed in the operation of the apparatus, vertical guide means for preventing canting of the lower roll in its vertical plane as it moves therein, and means for moving the lower roll toward the set of two upper rolls and for applying a pressure to said lower roll which will be transmitted to a glass sheet located between the set of upper rolls and the lower roll, while maintaining the parallelism of the lower roll to the two upper rolls, so as to sever a sheet of glass at a line therealong located generally in alignment with the lower roll, said last named means comprising bearings on the respective ends of the lower roll, fittings connected to each of said bearings by pivotal joints having a pivotal axis disposed normal to the vertical plane in which the lower roll is movable, vertical guide means cooperating with the fittings, said guide means, fittings, and pivotal joints opposing canting of the lower roll out of parallelism with the upper rolls, two expansible reciprocable pneumatically operated motors for moving the lower roll, the motors being disposed vertically and connected to the fittings outwardly of the pivotal joints on the fittings at the respective ends of the lower roll, a spring associated with each of the fittings and interposed between the respective fitting and its pneumatic motor, a source of pneumatic pressure, and a control valve for feeding the motors with air under pressure from said source.

7. The apparatus of claim 6, wherein the cylinders when under pressure constantly maintain the lower roll in elevated position.

8. The apparatus of claim 6, comprising means for controlling the lower roll in such manner that when it is raised from its lowermost position the motors raise it rapidly when the portion of the glass to be broken arrives vertically thereover, whereby the lower roll breaks the glass at such location.

9. Apparatus as defined in claim 6, comprising a motor for turning the two upper rolls whereby to aid in the feeding of the sheet or plate of glass through the glass-breaking apparatus.

10. Apparatus for severing a glass sheet at a predetermined line therealong, comprising a set of two parallel rolls and a third roll parallel thereto, the third roll being movable relatively toward and away from the set of two parallel rolls and positioned in the plane normal to the plane through the axes of the two rolls of the set and at equal distances therebetween, and means for moving the third roll toward the set of rolls and for applying a pressure to said third roll which will be transmitted to a glass sheet located between the set of rolls and the third roll while maintaining its parallelism therewith, so as to sever a sheet of glass at a line therealong located generally in alignment with the third roll, said last named means comprising bearings on the respective ends of the lower roll, two expansible reciprocable fluid motors for moving the third roll, the motors being disposed parallel to the direction of movement of the third roll and connected to the respective bearings on the ends of the third roll, fittings interposed between and connected to the bearings and the respective fluid motor, pivotal joints interposed between each of the bearings and its fitting, each of said joints having a pivotal axis disposed normal to the plane in which the third roll is movable; said joints opposing canting of the lower roll out of parallelism with the two rolls in the roll set.

11. Apparatus as defined in claim 10, comprising a spring associated with each of the fittings and interposed between the respective fitting and its fluid motor.

References Cited in the file of this patent

UNITED STATES PATENTS

| | | |
|---|---|---|
| 1,284,627 | Ewart et al. | Nov. 12, 1918 |
| 1,895,779 | Aurien et al. | Jan. 31, 1933 |
| 2,220,721 | Johnson | Nov. 5, 1940 |
| 2,354,323 | Layton | July 25, 1944 |
| 2,559,366 | Morris | July 3, 1951 |
| 2,756,545 | Atkeson | July 31, 1956 |
| 2,834,156 | Oberlin | May 13, 1958 |
| 2,920,197 | Potdevin et al. | Sept. 1, 1959 |